US012754990B2

(12) United States Patent
Mondello et al.

(10) Patent No.: US 12,754,990 B2
(45) Date of Patent: *Oct. 6, 2026

(54) SYSTEMS AND METHODS OF ACCOUNT VERIFICATION UPGRADE

(71) Applicant: Apple Inc., Cupertino, CA (US)

(72) Inventors: Richard J. Mondello, Mountain View, CA (US); Jay S. Mulani, San Francisco, CA (US); Jonathan Birdsall, Campbell, CA (US); Dmitry V. Belov, Santa Clara, CA (US); Reza Abbasian, Los Gatos, CA (US); David P. Quesada, San Francisco, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/818,945

(22) Filed: Aug. 29, 2024

(65) Prior Publication Data

US 2025/0061182 A1 Feb. 20, 2025

Related U.S. Application Data

(63) Continuation of application No. 18/461,322, filed on Sep. 5, 2023, now Pat. No. 12,086,231, which is a (Continued)

(51) Int. Cl.

*G06F 21/41* (2013.01)
*G06F 21/46* (2013.01)

(52) U.S. Cl.

CPC .............. *G06F 21/41* (2013.01); *G06F 21/46* (2013.01)

(58) Field of Classification Search

CPC ................................ G06F 21/41; G06F 21/46

See application file for complete search history.

(56) References Cited

U.S. PATENT DOCUMENTS

| | | | |
|---|---|---|---|
| 6,668,322 | B1 | 12/2003 | Wood et al. |
| 7,345,671 | B2 | 3/2008 | Robbin et al. |

(Continued)

FOREIGN PATENT DOCUMENTS

| | | | |
|---|---|---|---|
| CN | 1864377 | A | 11/2006 |
| CN | 101159557 | A | 4/2008 |

(Continued)

OTHER PUBLICATIONS

Chinese Patent Application No. CN202180040314.2 , Office Action, Mailed on May 22, 2025, 18 pages (10 pages of English translation and 8 pages of official language copy).

(Continued)

*Primary Examiner* — James R Turchen

(74) *Attorney, Agent, or Firm* — Kilpatrick Townsend & Stockton LLP

(57) ABSTRACT

A method and apparatus of a device that converts an account associated with an application to use a single sign-on service is described. In an exemplary embodiment, the device receives an indication of a weak password associated with the account. The device further sends a request to verify an account credential for a user associated with the device. In addition, the device receives the verification of the account credential. The device additionally requests a single sign-on credential for the account and receives the single sign-on credential. Furthermore, the device sends a message to a server associated with a service for the application that the application is registered for the single sign-on service.

20 Claims, 8 Drawing Sheets

Related U.S. Application Data continuation of application No. 17/303,291, filed on May 26, 2021, now Pat. No. 11,783,022.

(60) Provisional application No. 63/041,671, filed on Jun. 19, 2020, provisional application No. 63/033,070, filed on Jun. 1, 2020.

(56) References Cited

U.S. PATENT DOCUMENTS

| | | | | |
|---|---|---|---|---|
| 7,784,092 | B2 | 8/2010 | Pearson et al. | |
| 8,006,098 | B2 * | 8/2011 | Aupperle | H04L 63/083 726/8 |
| 8,014,756 | B1 | 9/2011 | Henderson | |
| 8,689,001 | B1 * | 4/2014 | Satish | G06F 21/46 713/184 |
| 8,806,196 | B2 | 8/2014 | Metke et al. | |
| 8,996,857 | B1 * | 3/2015 | Akella | G06F 21/41 713/153 |
| 9,203,829 | B1 * | 12/2015 | Levine | G06F 21/41 |
| 9,582,802 | B2 | 2/2017 | Bachenheimer et al. | |
| 9,756,000 | B1 | 9/2017 | Paulramachandran et al. | |
| 9,792,426 | B1 | 10/2017 | Driscoll et al. | |
| 9,935,942 | B2 | 4/2018 | Kim et al. | |
| 10,243,945 | B1 * | 3/2019 | Kruse | H04L 63/126 |
| 10,671,688 | B2 | 6/2020 | Nakashima | |
| 10,701,067 | B1 | 6/2020 | Ziraknejad et al. | |
| 11,601,419 | B2 * | 3/2023 | Ryu | G06F 3/0488 |
| 11,783,022 | B2 | 10/2023 | Mondello et al. | |
| 12,086,231 | B2 | 9/2024 | Mondello et al. | |
| 2001/0055388 | A1 * | 12/2001 | Kaliski, Jr. | H04L 9/085 713/155 |
| 2004/0193915 | A1 | 9/2004 | Smith et al. | |
| 2004/0205176 | A1 * | 10/2004 | Ting | H04L 67/306 709/223 |
| 2004/0224638 | A1 | 11/2004 | Fadell et al. | |
| 2005/0198173 | A1 | 9/2005 | Evans | |
| 2005/0198537 | A1 | 9/2005 | Rojewski | |
| 2006/0053296 | A1 | 3/2006 | Busboom et al. | |
| 2006/0218025 | A1 | 9/2006 | Miller et al. | |
| 2007/0011245 | A1 | 1/2007 | Kawashima et al. | |
| 2007/0299920 | A1 | 12/2007 | Crespo et al. | |
| 2010/0043065 | A1 * | 2/2010 | Bray | G06F 21/41 715/764 |
| 2010/0077469 | A1 * | 3/2010 | Furman | G06F 21/41 726/8 |
| 2010/0257578 | A1 | 10/2010 | Shukla et al. | |
| 2011/0010425 | A1 | 1/2011 | Bernatz | |
| 2011/0010762 | A1 | 1/2011 | Nijdam et al. | |
| 2011/0119747 | A1 | 5/2011 | Lambiase | |
| 2011/0246593 | A1 | 10/2011 | Crespo et al. | |
| 2012/0102326 | A1 | 4/2012 | Palekar | |
| 2012/0151210 | A1 | 6/2012 | Perez | |
| 2013/0067568 | A1 | 3/2013 | Obasanjo et al. | |
| 2013/0198823 | A1 * | 8/2013 | Hitchcock | G06F 21/41 726/6 |
| 2014/0046792 | A1 | 2/2014 | Ganesan | |
| 2014/0059658 | A1 | 2/2014 | Stecher | |
| 2014/0189808 | A1 | 7/2014 | Mahaffey et al. | |
| 2014/0189839 | A1 | 7/2014 | Jezek | |
| 2014/0230027 | A1 | 8/2014 | Cha et al. | |
| 2014/0236846 | A1 | 8/2014 | Melika et al. | |
| 2014/0237553 | A1 | 8/2014 | Feuer et al. | |
| 2014/0282919 | A1 | 9/2014 | Mason | |
| 2014/0366154 | A1 | 12/2014 | Van et al. | |
| 2015/0081552 | A1 | 3/2015 | Stewart | |
| 2016/0234343 | A1 | 8/2016 | Fausak et al. | |
| 2016/0359863 | A1 | 12/2016 | Krstic et al. | |
| 2016/0366119 | A1 * | 12/2016 | Rykowski | G06F 21/44 |
| 2016/0366122 | A1 | 12/2016 | Rykowski et al. | |
| 2016/0380957 | A1 | 12/2016 | Gupta et al. | |
| 2017/0339151 | A1 | 11/2017 | Van et al. | |
| 2018/0091490 | A1 | 3/2018 | Wang et al. | |
| 2018/0145968 | A1 * | 5/2018 | Rykowski | G06F 21/46 |
| 2018/0152440 | A1 | 5/2018 | Hande et al. | |
| 2018/0288030 | A1 | 10/2018 | Witrisna et al. | |
| 2019/0058707 | A1 | 2/2019 | Chung et al. | |
| 2019/0253251 | A1 | 8/2019 | Kobayashi | |
| 2019/0297089 | A1 | 9/2019 | Bryant | |
| 2020/0067907 | A1 | 2/2020 | Avetisov et al. | |
| 2020/0137038 | A1 * | 4/2020 | Endler | H04L 63/083 |
| 2020/0137052 | A1 | 4/2020 | Sunkavally et al. | |
| 2020/0153814 | A1 | 5/2020 | Smolny et al. | |
| 2020/0382495 | A1 | 12/2020 | Belov et al. | |
| 2021/0194883 | A1 | 6/2021 | Badhwar et al. | |

FOREIGN PATENT DOCUMENTS

| | | | |
|---|---|---|---|
| CN | 107948131 | A | 4/2018 |
| CN | 110177120 | A | 8/2019 |
| EP | 2575315 | A1 | 4/2013 |
| GB | 2503704 | A | 1/2014 |
| JP | 2002-281089 | A | 9/2002 |
| JP | 2016-004406 | A | 1/2016 |
| WO | 2014/105263 | A1 | 7/2014 |
| WO | 2020/039327 | A1 | 2/2020 |

OTHER PUBLICATIONS

European Patent Application No. EP21733339.2 , "Intention to Grant", May 26, 2025, 9 pages.

Korean Patent Application No. KR10-2022-7042592 , Notice of Decision to Grant, Mailed on Mar. 20, 2025, 6 pages (3 pages of English translation and 3 pages of official language copy).

"A Spamless Internet", https://www.dombox.org/dombox.pdf, Feb. 17, 2019.

Apple, "Support Universal Links", Web Archive, Retrieved from <https://web.archive.org/web/20180728030641/https://developer.apple.com/library/archive/documentation/ General/Conceptual/AppSearch/UniversalLinks.html>, Retrieved on Jul. 28, 2018, 4 pages.

Concise Description of Relevance under 35 USC 1.22(e) for U.S. Appl. No. 16/888,479, submitted Jun. 2, 2021, 10 pages.

Facebook, "Login for iOS", Web Archive, Retrieved from <https://web.archive.org/web/20131210005218/https://developers.facebook.com/docs/ios/login/>, Retrieved on Dec. 10, 2013, 5 pages.

Gmail, "Automatically forward Gmail messages to another account", Web Archive, Retrieved from <https://web.archive.org/web/20190203105529/https://support.google.com/mail/answer/10957?hl=en>, Retrieved on Feb. 3, 2019, 3 pages.

Gmail, "Email receiving limits", Web Archive, Retrieved from <https://web.archive.org/web/20181119034429/https://support.google.com/a/answer/1366776?hl=en>, Retrieved on May 4, 2021, 2 pages.

International Preliminary Report on Patentability received for PCT Patent Application No. PCT/US2020/035557, mailed on Dec. 16, 2021, 12 pages.

International Preliminary Report on Patentability received for PCT Patent Application No. PCT/US2020/035593, mailed on Dec. 16, 2021, 8 pages.

International Search Report and Written Opinion received for PCT Patent Application No. PCT/US2020/035557, mailed on Nov. 2, 2020, 16 pages.

Max Weinbach, "Android P adds new Biometrics API that supports iris, face, and fingerprint scanning", Web Archive, Retrieved from <https://web.archive.org/web/20181122134553/https://www.xda-developers.com/android-p-new-biometrics-api/>, Retrieved on Nov. 22, 2018, 8 pages.

Non-Final Office Action received for U.S. Appl. No. 17/303,291, mailed on Nov. 18, 2022, 8 pages.

Notice of Allowance received for U.S. Appl. No. 17/303,291, mailed on Aug. 2, 2023, 4 pages.

Notice of Allowance received for U.S. Appl. No. 17/303,291, mailed on Jul. 20, 2023, 9 pages.

Notice of Allowance received for U.S. Appl. No. 18/461,322, mailed on Jul. 1, 2024, 3 pages.

Notice of Allowance received for U.S. Appl. No. 18/461,322, mailed on May 9, 2024, 10 pages.

(56) References Cited

OTHER PUBLICATIONS

Observations by third parties received for European Patent Application No. 20746467.8, mailed on May 4, 2021, 15 pages.
Office Action received for Chinese Patent Application No. 202080040650.2, mailed on Nov. 1, 2022, 18 pages (9 pages of English Translation and 9 pages of Original Document).
PCT International Preliminary Report on Patentability for PCT/US2021/034463, mailed Dec. 15, 2022, 13 pages.
PCT International Search Report and Written Opinion of the International Search Authority, or the Declaration, for PCT/US2020/035593, mailed Aug. 27, 2020, 13 pages.
PCT International Search Report and Written Opinion of the International Searching Authority for PCT/US2021/034463, mailed Jul. 30, 2021, 19 pages.
PCT Invitation to Pay Additional Fees and, Where Applicable, Protest Fee, for PCT/US2020/035557, mailed Sep. 10, 2020, 13 pages.
PCT Third Party Observation for PCT/US2020/035557, date of submission Apr. 10, 2021, 6 pages.
PCT Third Party Observation for PCT/US2020/035593, date of submission Mar. 6, 2021, 2 pages,.
PCT Third Party Observation for PCT/US2020/035593, date of submission May 4, 2021, 4 pages.
Request for the Submission of an Opinion received for Korean Patent Application No. 10-2022-7042592, mailed on Apr. 30, 2024, 4 pages (2 pages of English Translation and 2 pages of Original Document).
Rick Fillion, "Developers: How we use SRP, and you can too", Web Archive, Retrieved from <https://web.archive.org/web/20190117084628/https://blog.1password.com/developers-how-we-use-srp-and-you-can-too/>, Feb. 14, 2018, 6 pages.
Shevek, "The Sender Rewriting Scheme", Web Archive, Retrieved from <https://web.archive.org/web/20190217091357/https://www.libsrs2.org/srs/srs.pdf>, Jun. 5, 2004, pp. 1-9.
Stackoverflow, "Native Facebook Login experience via browser", Web Archive, Retrieved from <https://web.archive.org/web/20150927002840/https://stackoverflow.com/questions/20943499/native-facebook-login-experience-via-browser>, Retrieved on Sep. 27, 2015, 2 pages.
Stackoverflow, "Use Facebook APP Authentication to automatically login to Mobile Website", Web Archive, Retrieved from <https://web.archive.org/web/20150325191219/http://stackoverflow.com/questions/7716883/use-facebook-app-authentication-to-automatically-login-to-mobile-website>, Retrieved on Mar. 25, 2015, 2 pages.
Third Party Submission—Concise Description of Relevance for 16888479, date of submission Apr. 27, 2021, 10 pages.
Third-Party Submission Under 37 CFR 1.290 received for U.S. Appl. No. 16/888,461, mailed on Apr. 8, 2021, 5 pages.
Third-Party Submission Under 37 CFR 1.290 received for U.S. Appl. No. 16/888,479, mailed on Jun. 2, 2021, 5 pages.
Third-Party Submission Under 37 CFR 1.290 received for U.S. Appl. No. 16/888,482, mailed on May 4, 2021, 2 pages.
Third-Party Submission under 37 CFR 1.290, Concise Description of Relevance, for U.S. Appl. No. 16/888,479, submitted Jun. 2, 2021, 10 pages.
Third-Party Submission under 37 CFR 1.290, date of submission in U.S. Appl. No. 16/888,479, May 4, 2021, 5 pages.
trashmail.com, "Features", Web Archive, Retrieved from <https://web.archive.org/web/20180904133419/https://trashmail.com/?cmd=features&lang=en>, Retrieved on May 4, 2021, 3 pages.
Trashmailservice, "TrashMail.net Tutorial Firefox Add-on Demo", Retrieved from <https://www.youtube.com/watch?v=NyTbXctxhRs>, Relevance: at 3:47, you can see that the "from" address and "To" addresses are embedded in the Reply-To address for reply processing, Relevant to claims: Claims 18-20, Nov. 22, 2009, 3 pages.
Virulhagiri Thirumavalavan, "Flowcharts", Retrieved from <https://www.dombox.org/flowcharts.pdf>, Retrieved on Feb. 17, 2019, Most relevant passage of drawings: Fig. 608 to Fig. 614, pp. 23 to 28, Relevant to claims: All claims, 32 pages.
Viruthagiri Thirumavalavan, "Dombox—The Zero Spam Mail System", https://web.archive.org/web/20190217071649/ https://medium.com/@Viruthagiri/dombox-the-zero-spam-mail-system-2b08ff7432cd, retrieved Feb. 17, 2019.
Youtube, "Facebook added Face Recognition |Facial Biometric Data | Facebook feature 2018", 0:50-0:54, Available Online on <https://www.youtube.com/watch?v=i04vtKAdOrU>, Feb. 16, 2018, 3 pages.
European Patent Application No. EP21733339.2 , "Intention to Grant", Feb. 3, 2025, 10 pages.
Chinese Patent Application No. CN202180040314.2 , Notice of Decision to Grant, Mailed on Oct. 27, 2025, 3 pages (1 page of English translation and 2 pages of official language copy).

* cited by examiner

SYSTEMS AND METHODS OF ACCOUNT VERIFICATION UPGRADE

This application is a continuation of U.S. application Ser. No. 18/461,322, filed Sep. 5, 2023, which is a continuation of U.S. application Ser. No. 17/303,291, filed May 26, 2021, issued as U.S. Pat. No. 11,783,022, which claims the benefit of U.S. Provisional Application No. 63/041,671 filed on Jun. 19, 2020 and U.S. Provisional Application No. 63/033,070 filed Jun. 1, 2020, both which are incorporated herein by reference.

FIELD OF INVENTION

This invention relates generally to an application sign on and more particularly to converting an application sign to an application single sign on.

BACKGROUND OF THE INVENTION

A single sign-on service is a service that allows a user to use a single set of credentials to sign-on to multiple services across one or more authorization domains. For example, a user could use a single username and password combination (or another set of user credentials) to sign-on for media streaming service from one company and a social media account from another company, even though these two companies are in different authorization domains. In this example, having a single sign-on service for multiple services over multiple authorization domains allows a user to remember just a single set of credentials for a variety of services from a variety of sources. Typically, when a user wishes to sign-on to a first service (e.g., launching an application for the first time, re-logging into an application, accessing a service through a web interface, accessing a service through digital media player, and/or another scenario in which the user is presented with an interface to authenticate with the service), the user is presented a user interface that displays a native sign-on user interface for the application and a single sign-on user interface (e.g., “connect with XYZ”).

SUMMARY OF THE DESCRIPTION

A method and apparatus of a device that converts an account associated with an application to use a single sign-on service is described. In an exemplary embodiment, the device receives an indication of a weak password associated with the account. The device further sends a request to verify an account credential for a user associated with the device. In addition, the device receives the verification of the account credential. The device additionally requests a single sign-on credential for the account and receives the single sign-on credential. Furthermore, the device sends a message to a server associated with a service for the application that the application is registered for the single sign-on service.

In a further embodiment, a non-transitory machine-readable medium having executable instructions to cause one or more processing units to perform a method to convert an account associated with an application to use a single sign-on service is described. In one embodiment, the machine-readable medium method receives an indication of a weak password associated with the account. The machine-readable medium method may further send a request to verify an account credential for a user associated with the device and receives the verification of the account credential. In addition, the machine-readable medium method may request a single sign-on credential for the account and receives the single sign-on credential. Furthermore, the machine-readable medium method may send a message to a server associated with a service for the application that the application is registered for the single sign-on service.

In a further embodiment, the machine-readable medium method may perform a local authorization on the device using a set of user credentials, where the of user credentials are selected from the group consisting of biometric user credentials or a username and password. The machine-readable medium method may further negotiate an authorization token with an identification server. In addition, the machine-readable medium method may forward the authorization token to the server associated with the service. Furthermore, the machine-readable medium method may convert the account to use the single sign-on service.

In another embodiment, the machine-readable medium method may present a third-party authorization user interface and receive third-party credentials from the user. The machine-readable medium method may further send the third-party credential, where the third-party credential is verified. In addition, the machine-readable medium method may detect an indication to use a third-party authorization mechanism. Furthermore, a single sign-on service is a service that allows a user to use a single set of credentials to sign-on to multiple services across one or more authorization domains.

In another embodiment, a method to convert an account associated with an application to use a single sign-on service is described. In one embodiment, the method receives an indication of a weak password associated with the account. The method may further send a request to verify an account credential for a user associated with the device and receives the verification of the account credential. In addition, the method may request a single sign-on credential for the account and receives the single sign-on credential. Furthermore, the method may send a message to a server associated with a service for the application that the application is registered for the single sign-on service.

In a further embodiment, the method may perform a local authorization on the device using a set of user credentials, where the of user credentials are selected from the group consisting of biometric user credentials or a username and password. The method may further negotiate an authorization token with an identification server. In addition, the method may forward the authorization token to the server associated with the service. Furthermore, the method may convert the account to use the single sign-on service.

In another embodiment, the method may present a third-party authorization user interface and receive third-party credentials from the user. The method may further send the third-party credential, where the third-party credential is verified. In addition, the method may detect an indication to use a third-party authorization mechanism. Furthermore, a single sign-on service is a service that allows a user to use a single set of credentials to sign-on to multiple services across one or more authorization domains.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
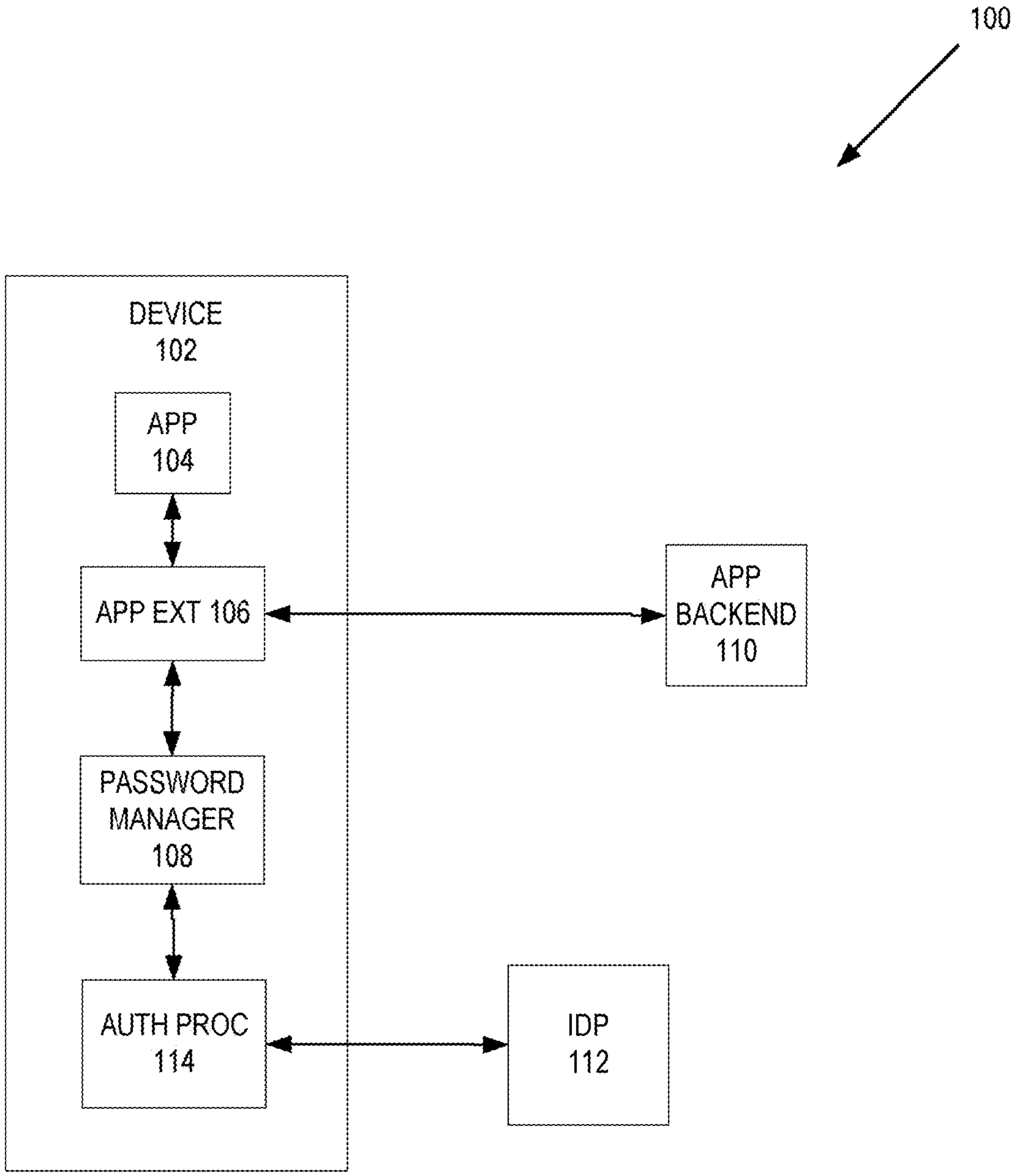
FIG. 1 is an illustration of one embodiment of a system that converts an application sign on to a single sign.

A method and apparatus of a device that converts an account associated with an application to use a single sign-on service is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that converts an account associated with an application to use a single sign-on service is described. In one embodiment, a single sign-on service is a service that allows a user to use a single set of credentials to sign-on to multiple services across one or more authorization domains. For example, a user could use a single username and password combination (or another set of user credentials) to sign-on for media streaming service from one company and a social media account from another company, even though these two companies are in different authorization domains. In this embodiment, having a single sign-on service for multiple services over multiple authorization domains allows a user to remember just a single set of credentials for a variety of services from a variety of sources. Typically, when a user wishes to sign-on first service (e.g., launching an application for the first time, re-logging into an application, accessing a service through a web interface, accessing a service through digital media player, and/or another scenario in which the user is presented with an interface to authenticate with the service), the user is presented a user interface that displays a native sign-on user interface for the application and a single sign-on user interface (e.g., "connect with XYZ").

In one embodiment, a single sign-on service allows the user to sign-on with different services across different authorization domains using a single set of credentials and without sharing the private information unless the user explicitly authorizes this private information sharing. In this embodiment, for the single sign-on service, the user is associated with a user identifier that can be used to authenticate a user and authorize the user and/or the user's devices to use one or more services across multiple authorization domains. In addition, the user can control what information is shared with these service providers. In one embodiment, each of the user's set of devices (e.g., smartphone, tablet, laptop, digital media player, and/or another device) is a trusted device. In a further embodiment, the user's device is trusted because each of the devices has been signed into using an elevated trusted mechanism, such as two factor authentication. For example and in one embodiment, a trusted device is a device that the authorization domain knows is a user device for a user and that can be used to verify a user's identity.

In one embodiment, an authorization domain is a collection of one or more services and/or authorization mechanism (s) that allow a user to be authorized for the one or more of the services provided by authorization domain using the authorization mechanism(s) of that authorization domain. In addition, one or more user devices associated with a user can be authorized for the one or more authorization services using these authorization mechanism(s). In one embodiment, each user is associated with a unique identifier (e.g., the user identifier) that can be used across the authorization domain. For example and in one embodiment, an authorization domain can be used by a user and/or the user's device(s) to purchase applications, purchase and/or stream media, store content in a cloud storage, access social media, and/or other types of services.

In one embodiment, the single sign-on service provides a single sign-on for multiple services provided by a native application on the user's device or through a web browser across multiple authorization domains. This allows a user to sign-onto different applications and/or services with the user's identifier without exposing the user identifier (and/or other private information) to the developers or providers of the different applications and/or services.

In addition, and in one embodiment, an application can convert the sign-on process from one using a set of customized set of credentials (e.g., a specific username and password) to a sign-on process using the single sign-on. In this embodiment, the conversion to using the single sign-on process involves converting the application and an application backend that supports the application to use the single sign-on process. In one embodiment, the application and application backend provide a service for a user with an account for the service. For user to use the account for the service, the user will provide a set of credentials (e.g., a username and password, or some other set of credentials) that identifies the user to the service and identifies what level of features of the service that is available to the user. By converting the service to using the single sign-on, the application and application backend can authorize the user for the service with the single sign-on.

FIG. 1 is an illustration of one embodiment of a system that converts an application sign on to a single sign. In FIG. 1, the system 100 includes a device 102 that is coupled to an application backend 110 and an identity provider 112. In one embodiment, the device 102 includes an application 104, an application extension 106, password manager 108, and authorization process 114. In this embodiment, the device 102 can be any type of device that can execute the application 104 (e.g., smartphone, laptop, personal computer, server, tablet, wearable, vehicle component, and/or any type of device that can process instructions of an application). Furthermore, and in one embodiment, the application 104 can be a word processing application, spreadsheet, contacts, mail, phone, web browser, media player, review application, classified advertisement application, social media and/or networking, productivity, utility, game, real estate, photo, video, e-commerce, storefront, coupon, operating system, and/or any other type of application that can run on the device. In addition, the application 104 can support a service via an account for the service that could require some sort of credentials by a user for the application 104 to enable the service for the user. In one embodiment, the credential can be a username and password combination or some other type of credential that the service provider uses to authorize the user to access the service. In this embodiment, by the user using the credentials for the service, the application 104 is enabled to provide the service to the user.

In one embodiment, an application extension 106 is a process that provides access to the application's 104 functionality via an operating system of the device 102. For example and in one embodiment, an application extension 106 can provide functionality to other applications or operating system features on the device 102 (e.g., as a widget, offer image or media manipulation functionalities, data sharing, audio processing, custom actions, and/or any other type of functionality that an application can provide). For example and in one embodiment, the application extension 106 can be used to communicate with the application backend 110 and to convert an application sign-on from an account username and password that is customized for the service corresponding to the application to a universal single sign-on. An example of this single sign-on service is illustrated in U.S. patent application Ser. No. 16/888,479, entitled "SYSTEMS AND METHODS OF APPLICATION SINGLE SIGN ON", filed on May 29, 2020, which is incorporated herein by reference.

In one embodiment, the application extension 106 can be used to convert a sign-on process for a service from a customized username and password (or some other forms of credential specific to an account for that service) to single sign-on mechanism that is common for multiple applications across an authorization domain.

In one embodiment, the application is associated with a particular identity provider, such as the identity provider 112. For example and in one embodiment, if the application (and corresponding account) is for a streaming media service, the corresponding identity provider can be one that supports this streaming media service. The identity provider can be one that verifies an identity for a wide variety services and/or applications (e.g., a large media company, technology provider, etc.) or a specialized identity provider that verifies identities for a narrow group of applications and/or services (e.g., a corporation, government, educational organization, etc.). In response, the application extension 106 can request to the password manager 108 to present an authorization user interface on the device 102. In one embodiment, the authorization user interface is handled by the authorization process 114.

In one embodiment, the authorization user interface requests the user to sign-on for the conversion of the account to a single sign-on. In response to the authorization user interface being presented, the user elects the single sign on and enters the user credentials. With the received user credentials, the authorization process 114 can perform a local authentication using the authentication components that are part of the authorization process 114 and the secure hardware (not illustrated). For example and in one embodiment, the authorization process 114 sensors capture biometric data and performs a local authentication using the sensor data in the secure hardware. For example and in one embodiment, a biometric sensor is used for facial recognition to gather data for a comparison with a template in secure hardware. In one embodiment, by performing the local authentication, the authorization process 114 is determining that the user interacting with the authorization process 114 is known to the device 102. In one embodiment, the authorization requesting device 102 does not require a two-factor authentication because the authorization requesting device 102 is a trusted device with a valid access continuation parameter.

If the authorization process 114 is successful with the local authentication, the authorization process 114 sends a server authorization request to the identity provider 112. In one embodiment, the server authorization is used to authenticate the user and to authorize the device 102 to convert the account to use the single sign-on. In this embodiment, the authorization process 114 sends a secure remote protocol (SRP) request to the identity provider 112 with the access continuation parameter. In one embodiment, the authorization requesting device 114 is trusted based on a two-factor authentication for the device. As a result of the two-factor authentication, the device 102 receives an access continuation parameter, which can be used in the server authorization request to the identify provider 112. In one embodiment, the access continuation parameter allows the device 102 to access an account associated with the user without having the device 102 provide the user's set of credentials. In one embodiment, an access continuation parameter is described in U.S. Patent Publication No. 2016/0359863, entitled "Account Access Recovery System, Method and Apparatus," filed Sep. 30, 2015, which is incorporated by reference. In response to receiving the SRP request, the identity provider 112 authenticates the user using the received credentials and receives an authorization response includes an authorization code and a token. In some embodiments, the identity provider 112 may provide an attestation that the device 102 is a device 102 from a particular manufacturer with particular security hardware present on the device (e.g., secure hardware, biometric authentication hardware/sensors) that may be provided to the application.

In a further embodiment, the authorization process 114 returns the authorization response to the password manager 108. The password manager 108 sends the sign-in with single sign-on credentials to the application extension 106, which forwards the single sign-on credentials to the application backend 110. In one embodiment, the application backend 110 is a device (or a set of devices) that supports the application by providing a remote service to the application 104. For example and in one embodiment, the application backend 110 can provide authorization service for the service (e.g., validating the credentials of the account), enabling a service on the device 102 (e.g., providing access to social media or network, access to media, banking, medical service, government service, and/or another type of service delivered over a network). In one embodiment, with the single sign-on credentials, the application backend 110 can convert the authorization process used by the application backend 110 from one using a set of account credentials to using the single sign-on credentials. Conversion of an account from a set of custom credentials to a single sign-on credentials is further described in FIGS. 3 and 4. In a further embodiment, the device can present a third-party user interface that is used to authorize a conversion of an account to use the single sign-on credentials. Conversion of an account from a set of custom credentials to a single sign-on credentials using a third-party user interface is further described in FIGS. 5 and 6.

In one embodiment, and in addition to the application sign-on process described in FIG. 1 above, the device can provide a password for a username of an account that is associated with the application. In this embodiment, the device can receive an indication from a user that the user would like to update a password with a password suggested by the device. In one embodiment, the device could analyze the saved password to determine if the password is a weak password (e.g., including full words, a password common to other accounts, passwords with easily detectable patterns (e.g., increasing numbers or letters, letters or numbers that follow keyboards patterns, etc.), passwords with known names of the user or relative or friends of the user, passwords derived from characteristics of the user (e.g., own birthday, spouse or kids birthday, etc.), passwords taken from or derived from known compromised services (e.g. result of a hacking), and/or other types of weak passwords. In one embodiment, the device can detect a weak, saved password for an account in a password repository of the device and suggests that the user either upgrade the password to a stronger, device-generated password the account or can convert the account to use the single sign-on mechanism.

Figure 2:
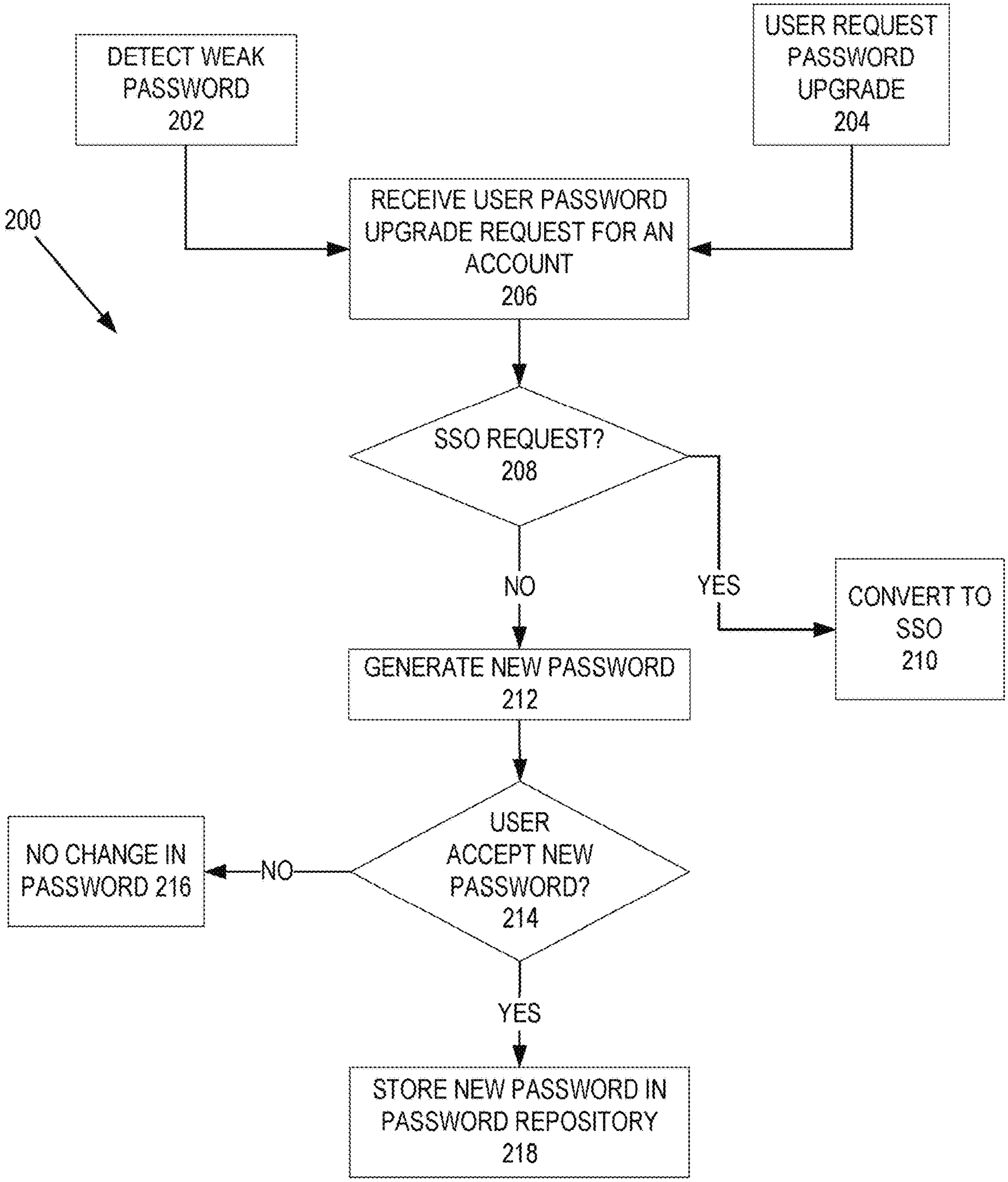
FIG. 2 is an illustration of one embodiment of a process to upgrade an application sign.

FIG. 2 is an illustration of one embodiment of a process 200 to upgrade an application sign-on. In FIG. 2, process 200 beings by either detecting a weak password for an account at block 202 or detecting that a user has requested a password upgrade for that account. In one embodiment, the weak password can be one as described above. Alternatively, the user can request, through a user interface, an upgrade of a password for that account. At block 204, process 200 receives the user password upgrade request. Process 200 determines if the password upgrade request is a request to use a single sign-on service for this account. If the password upgrade request is a request to use a single sign-on service for this account, execution proceeds to block 210 below. If the request is not to use a single sign-on service for this account and is to upgrade the password, process 200 generates and presents the new password to the user at block 212. In one embodiment, process 200 generates a strong password, where a strong password is one that is designed to be hard for a person or program to discover. Because the purpose of a password is to ensure that only authorized users can access resources, a password that is easy to guess is a security risk. Essential components of a strong password can include sufficient length and a mix of character types. If process 200 detects that the user has accepted the presented password at block 214, process 200 stores the new password in a password repository that is on the device. If process 200 detects that the user did not accept the new password, process 200 does not upgrade the current password at block 216.

As described above, if the user indicates that the password upgrade is a conversion to a single sign-on for the account, at block 210, process 200 converts the account to a single sign-on. Converting to a single sign-on is further described in FIGS. 3-6 below.

Figure 3:
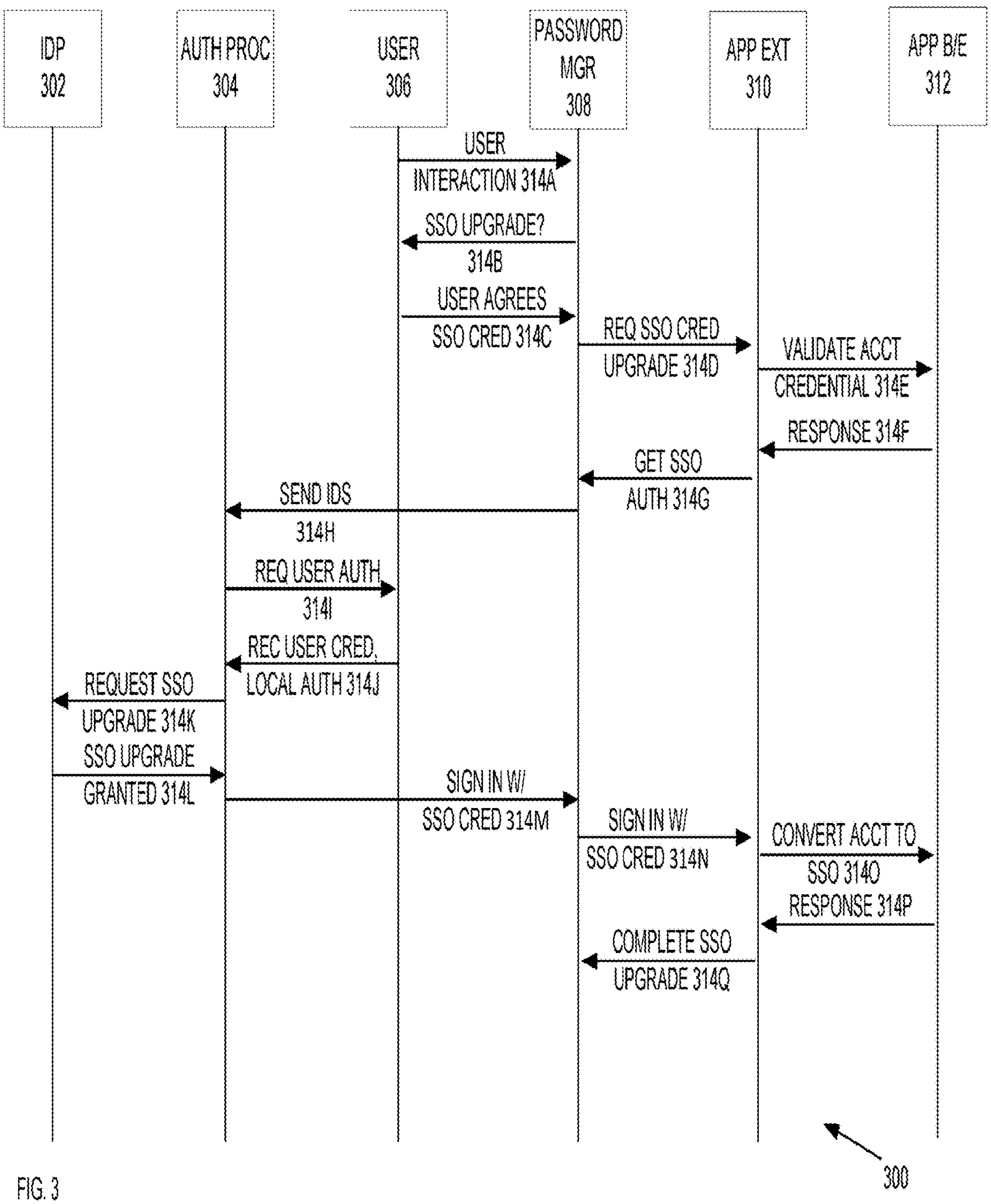
FIG. 3 is an illustration of one embodiment of a flow that converts an application sign on to a single sign-on using a local user interface.

As descried above, the device can convert an account from using a specific set of user credentials tied to an account to a single sign-on process. FIG. 3 is an illustration of one embodiment of a flow 300 that converts an application sign on to a single sign-on using a local user interface. In FIG. 3, the flow 300 begins by the password manager 308 detecting a user interaction (314A). In one embodiment, the user may have triggered a password autofill, which can offer the user to generate a strong password for an account associated with the application or can offer the user to upgrade the accounts to use the single sign-on mechanism. Alternatively, the use could visit a user interface of the password manager 308 and view the current credentials for the account, where the password manager prompts the user to upgrade the credentials. The password manager can further check to determine if the credential include a weak password and if the account with a domain that has an application extension that can support the single sign-on process. If either of these checks is true (or in another embodiment, both of the checks are true), the password manager 308 presents a user interface that offers to upgrade the account to a single sign-on (314B). The user 306 can choose to upgrade (314C) the account to the credential for this account to a single sign-on. The password manager 308 receives the indication for single sign-on conversion.

In response to the password manager 308 receiving the indication for single sign-on conversion, the password manager 308 sends a request to the application extension 310 to upgrade the existing account credentials (314D) to a single sign-on mechanism. The application extension 310 sends a request to the application backend 312 to validate the existing credentials of the account. In one embodiment, the application extension 310 provides the credentials to the application backend 312. In another embodiment, the application backend 312 retrieves the credentials for this account that are stored with the application backend 312. The application backend 312 validates the account credentials and sends a response (314F) to the application extension 310. If the application backend 312 can validate the current account credentials, the application extension 310 sends request to the password manager 308 to get a single sign-on authorization from password manager 308 (314G). If the application backend 312 cannot validate the current account credentials, the flow 300 ends.

If the application backend 312 validates the current account credentials, the flow 300 continues by the password manager 308 sending a set of identifiers to the authorization process 304 (314H). In one embodiment, the set of identifiers includes an application identifier and a developer identifier. An application 104 can have one developer identifier or multiple developer identifiers for different bundles of one or more applications (e.g., an entity with a large number of software engineers). The authorization process requests for an authorization consent (3141) to the user 306. In one embodiment, the authorization process 304 asks for the authorization consent by presenting an authorization user interface on the device. In response, the authorization process 304 receives user consent (314J) by the user 306 entering the user credentials via the authorization user interface, where the user credentials can be a face identifier, touch identifier, pincode, and/or another type of user credential. In one embodiment, the authorization process 304 presents the authorization user interface and receives the user consent as described in FIG. 1 above. In this embodiment, by asking for and receiving consent by the user, the authorization process 304 is performing a local authentication to authenticate the user as part of the authorization for account credential upgrade process. In one embodiment, the authorization user interface generic user interface or is based on at least a generic user interface template that can be used for multiple different applications.

In a further embodiment, with the local authentication performed by the authorization process 304, the authorization process 304 sends a single sign-on request (314K) to the identity provider 302. In one embodiment, the server authorization request includes the access continuation parameter and the name of the application. In this embodiment, the server authorization request is used to check that the access continuation parameter is still valid, to generate a token that is used by the application for authorization, and that the third party web site is allowed for this operation (e.g. associated with a valid registered developer for this website). If the authorization is successful, the identity provider 302 returns an authorization response for the granted single sign-on upgrade (314L) to the authorization process 304. In one embodiment, the authorization response includes an access continuation parameter and an identity token.

In one embodiment, with the authorization response that grants the single sign-on upgrade, the authorization process 304 sends (314M) a sign-in with the single sign-on credentials to the password manager 308. The password manager 308, in turn, sends (314N) a sign-in with the single sign-on credentials to the application extension 310. The application extension 310 sends (3140) the single sign-on credentials to the application backend 312 so as to converts the account to use the single sign-on credentials. If this conversion is successful, the application backend 312 sends a response (314P) to the application extension indicating that conversion is successful. The application extension 310 sends a message to the password manager indicating that single sign-on upgrade is completed (314Q). The password manager 308 deletes any saved credential for the account as this credential is no longer needed.

Figure 4:
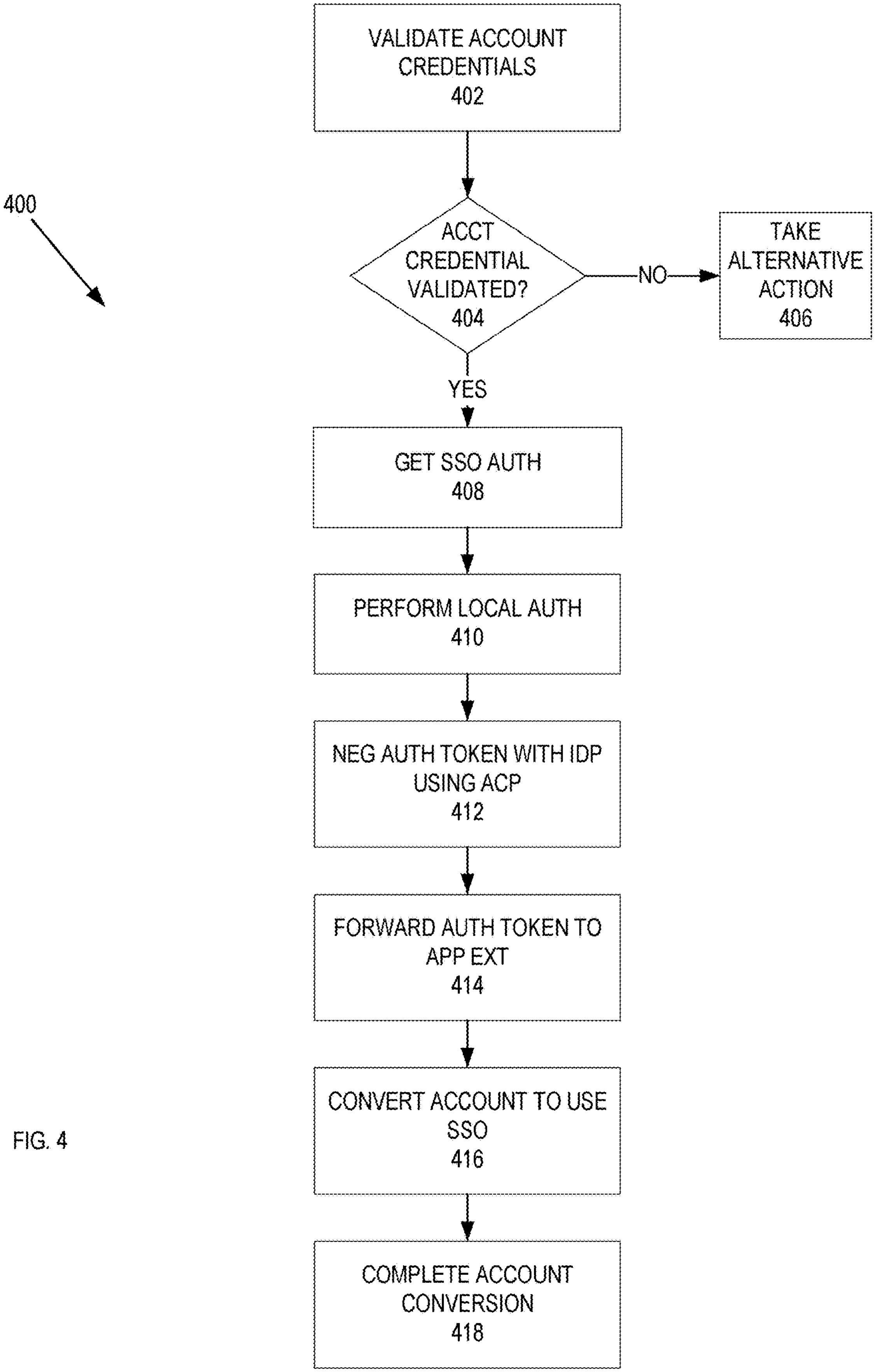
FIG. 4 is an illustration of one embodiment of a process to converts an application sign on to a single sign-on using a local user interface.

FIG. 4 is an illustration of one embodiment of a process 400 to converts an application sign on to a single sign-on using a local user interface. In one embodiment, a device interfacing with a user performs process 400, such as the device 102 as in FIG. 1 above. In FIG. 4, process 400 begins by verifying the account credentials at block 402. In one embodiment, the account credentials are the credentials for the account that the application can use prior to the conversion to a single sign-on. In this embodiment, process 400 sends a request an application backend to validate the account credentials and the application backend sends a response as to whether the account credential validation was successful. If the account validation fails, execution proceeds to block 406, where process 400 takes alternative action. If the account validation succeeds, at block 408, process 400 gets a single sign-on authorization. In one embodiment, process 400 sends a request for the single sign-on authorization to the password manager.

Process 400 performs a local authentication at block 410. In one embodiment, process 400 performs a local authentication by presenting an authorization user interface to the user. In one embodiment, process 400 presents the user single sign-on authorization request to a user using an authorization user interface and prompting the user for the user's credentials. Process 400 receives the user credentials, where the user credentials can be a face identifier, touch identifier, pincode, and/or another type of user credentials. With the user credentials, process 400 performs a local authentication. In one embodiment, process 400 performs the local authentication using the authentication components that are part of the authorization process and the secure hardware of the device as described in FIG. 1 above. If the local authentication is successful, process 400 negotiates an authorization token with the identity provider at block 412. In one embodiment, the server authorization request includes the access continuation parameter and an application identifier. In this embodiment, the server authorization request is used to check that the access continuation parameter is still valid, to generate a token that is used by the application for authorization, and that the application is allowed for this operation (e.g. associated with a valid registered developer for this application). In one embodiment, process 400 sends a SRP request to the identity provider, where this request is used to identify the user and device that sent the server request to the identity provider and to authorize the application for the user. For example and in one embodiment, process sends the server authorization request as described in FIG. 1 above. In addition, process 400 receives the authorization token from the identity provider. Process 400 further forwards authorization token to the requesting application extension at block 414. In one embodiment, the application uses the authorization token to authorization the use of single sign-on for the account and/or the application. In one embodiment, this sequence may establish the anonymous user identifier for use with the web site or domain associated with the application. For a subsequent request, the anonymous identity token and authorization code are stored in an application authorization cache on the authorization requesting device and the single sign on (or another type of sign on for the application) is not needed until the user signs out of the application.

At block 416, process 400 converts the account to use single sign-on. In one embodiment, process 400 converts the account to use single sign-on by sending a message to the application backend, which does the account conversion. The application backend sends a message back to process 400 to indicate whether the account conversion was successful. If the account conversion was successful, process 400 completes the account conversion at block 418. In one embodiment, process 400 completes the account conversion by deleting any saved credentials for this account.

Figure 5:
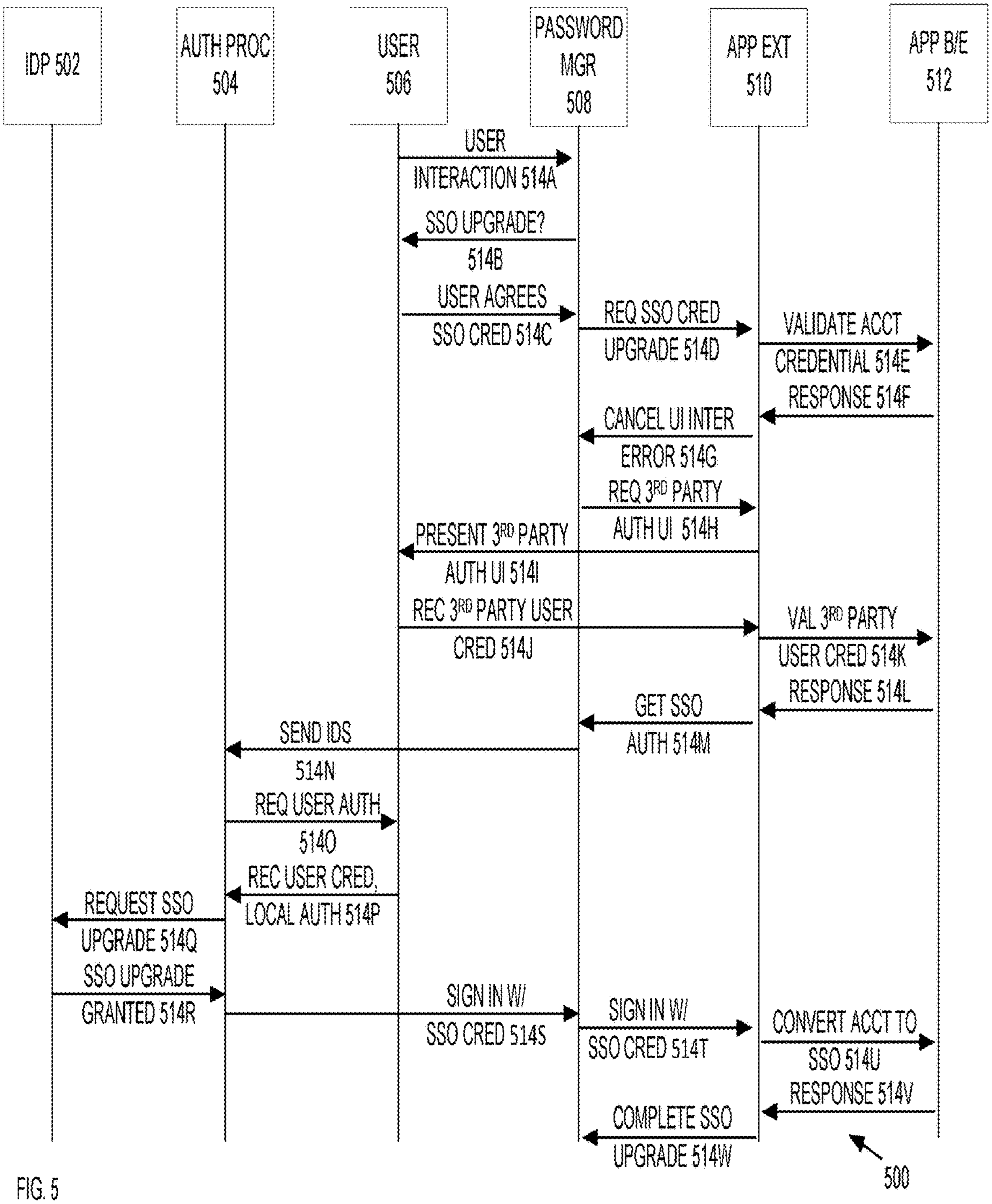
FIG. 5 is an illustration of one embodiment of a flow that converts an application sign on to a single sign-on using a third party user interface.

FIG. 5 is an illustration of one embodiment of a flow 500 that converts an application sign on to a single sign-on using a third party user interface. In FIG. 5, the flow 500 begins by the password manager 508 detecting a user interaction (514A). In one embodiment, the user may have triggered a password autofill, which can offer the user to generate a strong password for an account associated with the application or can offer the user to upgrade the accounts to use the single sign-on mechanism. Alternatively, the use could visit a user interface of the password manager 508 and view the current credentials for the account and the password manager prompts the user to upgrade the credentials. The password manager can further check to determine if the credential include a weak password and if the account with a domain that has an application extension that can support the single sign-on process. If either of these checks is true (or in another embodiment, both of the checks are true), the password manager 508 presents a user interface that offers to upgrade the account to a single sign-on (514B). The user 506 can choose to upgrade (514C) the account to the credential for this account to a single sign-on. The password manager 508 receives the indication for single sign-on conversion.

In response to the password manager 508 receiving the indication for single sign-on conversion, the password manager 508 sends a request to the application extension 510 to upgrade the existing account credentials (514D) to a single sign-on mechanism. The application extension 510 sends a request to the application backend 512 to validate the existing credentials of the account. In one embodiment, the application extension 510 provides the credentials to the application backend 512. In another embodiment, the application backend 512 retrieves the credentials for this account that are stored with the application backend 512. The application backend 512 validates the account credentials and sends a response (514F) to the application extension 510. In one embodiment, the response can include an indication to use a customized user interface for the local authentication.

In one embodiment, and unlike the flow 300 in FIG. 3, flow 500 can present a customized user interface for local authentication. In one embodiment, the application extension 510 cancels the user interface error (514G) to the password manager 508, so as signal to the password manger that further authorization is needed. The password manager 508, seeing the error, requests a third-party user authorization interface from the application extension 510 (514H). The application extension 510 presents the third-party user authorization interface to the user (5141). The user responds, indicating approval to proceed with the single sign-on conversion (514J), where the approval (and the user credentials for the account) is returned to the application extension 510. The application extension forwards the account credentials to the application backend 512 (514K), where the application backend 512 validates account credentials, and returns a response (514L) to the application extension 510.

If the application backend 512 can validate the current account credentials, the application extension 510 sends request to the password manager 508 to get a single sign-on authorization from password manager 508 (514M). If the application backend 512 cannot validate the current account credentials, the flow 500 ends.

If the application backend 512 validates the current account credentials, the flow 500 continues by the password manager 508 sending a set of identifiers to the authorization process 504 (514N). In one embodiment, the set of identifiers includes an application identifier and a developer identifier. The authorization process requests for an authorization consent (5140) to the user 506. In one embodiment, the authorization process 504 asks for the authorization consent by presenting an authorization user interface on the device. In response, the authorization process 504 receives user consent (514P) by the user 506 entering the user credentials via the authorization user interface, where the user credentials can be a face identifier, touch identifier, pincode, and/or another type of user credential. In one embodiment, the authorization process 504 presents the authorization user interface and receives the user consent as described in FIG. 1 above. In this embodiment, by asking for and receiving consent by the user, the authorization process 504 is performing a local authentication to authenticate the user as part of the authorization for account credential upgrade process. In one embodiment, the authorization user interface generic user interface or is based on at least a generic user interface template that can be used for multiple different applications.

In a further embodiment, with the local authentication performed by the authorization process 504, the authorization process 504 sends a single sign-on request (514Q) to the identity provider 502. In one embodiment, the server authorization request includes the access continuation parameter and the name of the application. In this embodiment, the server authorization request is used to check that the access continuation parameter is still valid, to generate a token that is used by the application for authorization, and that the third party web site is allowed for this operation (e.g. associated with a valid registered developer for this website). If the authorization is successful, the identity provider 502 returns an authorization response for the granted single sign-on upgrade (514R) to the authorization process 504. In one embodiment, the authorization response includes an access continuation parameter and an identity token.

In one embodiment, with the authorization response that grants the single sign-on upgrade, the authorization process 504 sends (514S) a sign-in with the single sign-on credentials to the password manager 508. The password manager 508, in turn, sends (514T) a sign-in with the single sign-on credentials to the application extension 510. The application extension 510 sends (514U) the single sign-on credentials to the application backend 512 so as to converts the account to use the single sign-on credentials. If this conversion is successful, the application backend 512 sends a response (514V) to the application extension indicating that conversion is successful. The application extension 510 sends a message to the password manager indicating that single sign-on upgrade is completed (514W). The password manager 508 deletes any saved credential for the account as this credential is no longer needed.

Figure 6:
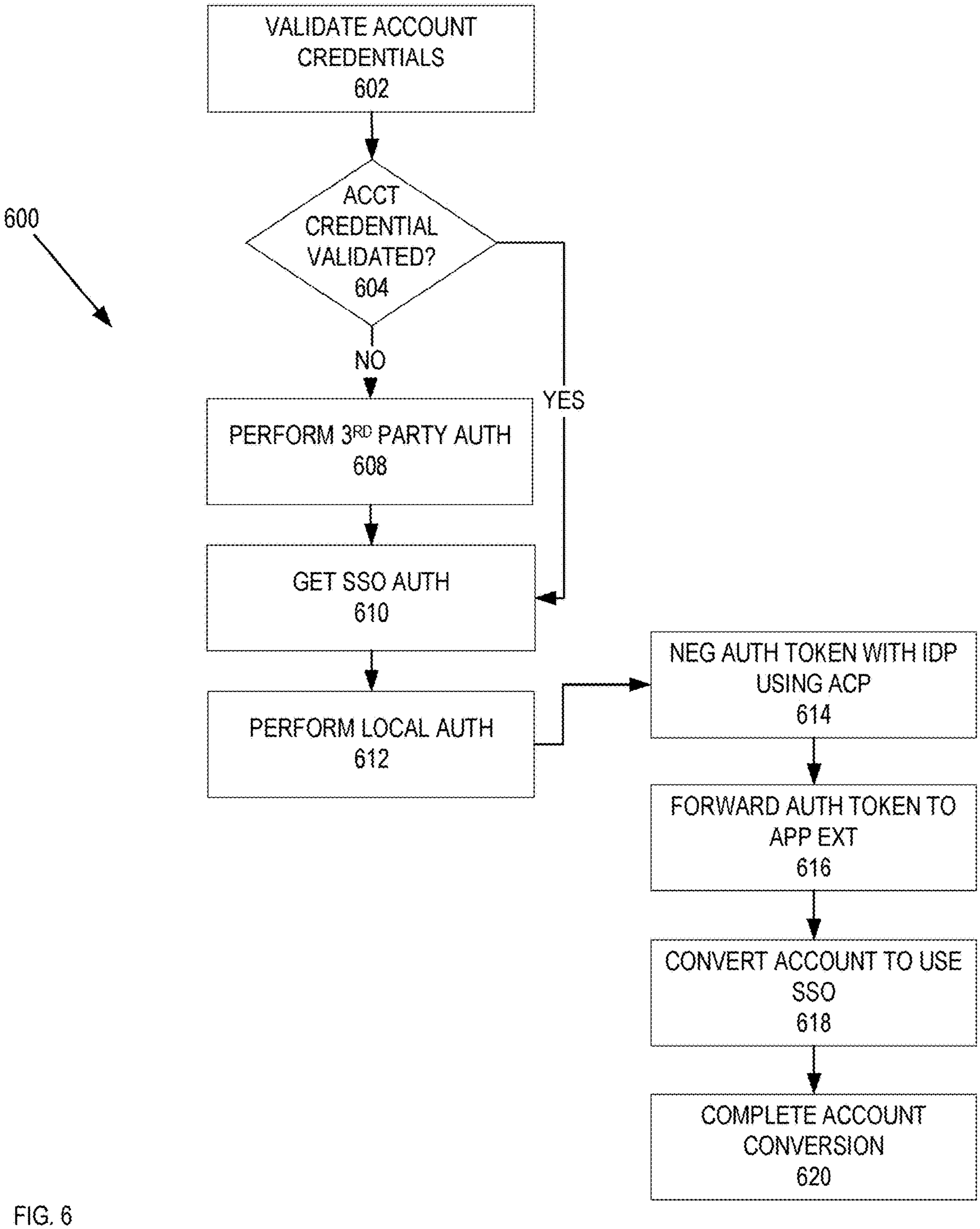
FIG. 6 is an illustration of one embodiment of a process to converts an application sign on to a single sign-on using a third party user interface.

FIG. 6 is an illustration of one embodiment of a process to converts 600 an application sign-on to a single sign-on using a third party user interface. In one embodiment, a device interfacing with a user performs process 600, such as the device 102 as in FIG. 1 above. In FIG. 6, process 600 begins by verifying the account credentials at block 602. In one embodiment, the account credentials are the credentials for the account that the application can use prior to the conversion to a single sign-on. In this embodiment, process 600 sends a request an application backend to validate the account credentials and the application backend sends a response as to whether the account credential validation was successful. If the account validation fails, execution proceeds to block 606, where process 600 takes alternative action. If the account validation succeeds execution proceeds to the block 610 below. If the account validation fails, execution proceeds to block 608 below.

At block 608, process 600 performs a third-party authorization. In one embodiment, process 600 performs the third-party authorization because the account credentials are invalid, out of date, or need to be refreshed. In one embodiment, process 600 requests a third-party user interface from an application extension and presents this third-party user interface to the user. The user enters the appropriate information, such as the account credentials. In one embodiment, the third-party user interface may request the existing user credentials or additional credentials (e.g., a two factor authentication code, or some other secret information to further authenticate for the account). Process 600 sends these account credentials are sent to the application backend, where the application backend validates the account credentials. If the account credentials are validated by the application backend, the application backend sends a response to process 600. With the validated account credentials, at block 608, process 600 gets a single sign-on authorization. In one embodiment, process 600 sends a request for the single sign-on authorization to the password manager.

Process 600 performs a local authentication at block 612. In one embodiment, process 600 performs a local authentication by presenting an authorization user interface to the user. In one embodiment, process 600 presents the user single sign-on authorization request to a user using an authorization user interface and prompting the user for the user's credentials. Process 600 receives the user credentials, where the user credentials can be a face identifier, touch identifier, pincode, and/or another type of user credentials. With the user credentials, process 600 performs a local authentication. In one embodiment, process 600 performs the local authentication using the authentication components that are part of the authorization process and the secure hardware of the device as described in FIG. 1 above. If the local authentication is successful, process 600 negotiates an authorization token with the identity provider at block 614. In one embodiment, the server authorization request includes the access continuation parameter and an application identifier. In this embodiment, the server authorization request is used to check that the access continuation parameter is still valid, to generate a token that is used by the application for authorization, and that the application is allowed for this operation (e.g. associated with a valid registered developer for this application). In one embodiment, process 600 sends a SRP request to the identity provider, where this request is used to identify the user and device that sent the server request to the identity provider and to authorize the application for the user. For example and in one embodiment, process sends the server authorization request as described in FIG. 1 above. In addition, process 600 receives the authorization token from the identity provider.

Process 600 further forwards authorization token to the requesting application extension at block 616. In one embodiment, the application uses the authorization token to authorization the use of single sign-on for the account and/or the application. In one embodiment, this sequence may establish the anonymous user identifier for use with the web site or domain associated with the application. For a subsequent request, the anonymous identity token and authorization code are stored in an application authorization cache on the authorization requesting device and the single sign on (or another type of sign on for the application) is not needed until the user signs out of the application.

At block 618, process 600 converts the account to use single sign-on. In one embodiment, process 600 converts the account to use single sign-on by sending a message to the application backend, which does the account conversion. The application backend sends a message back to process 600 to indicate whether the account conversion was successful. If the account conversion was successful, process 600 completes the account conversion at block 620. In one embodiment, process 600 completes the account conversion by deleting any saved credentials for this account.

Figure 7:
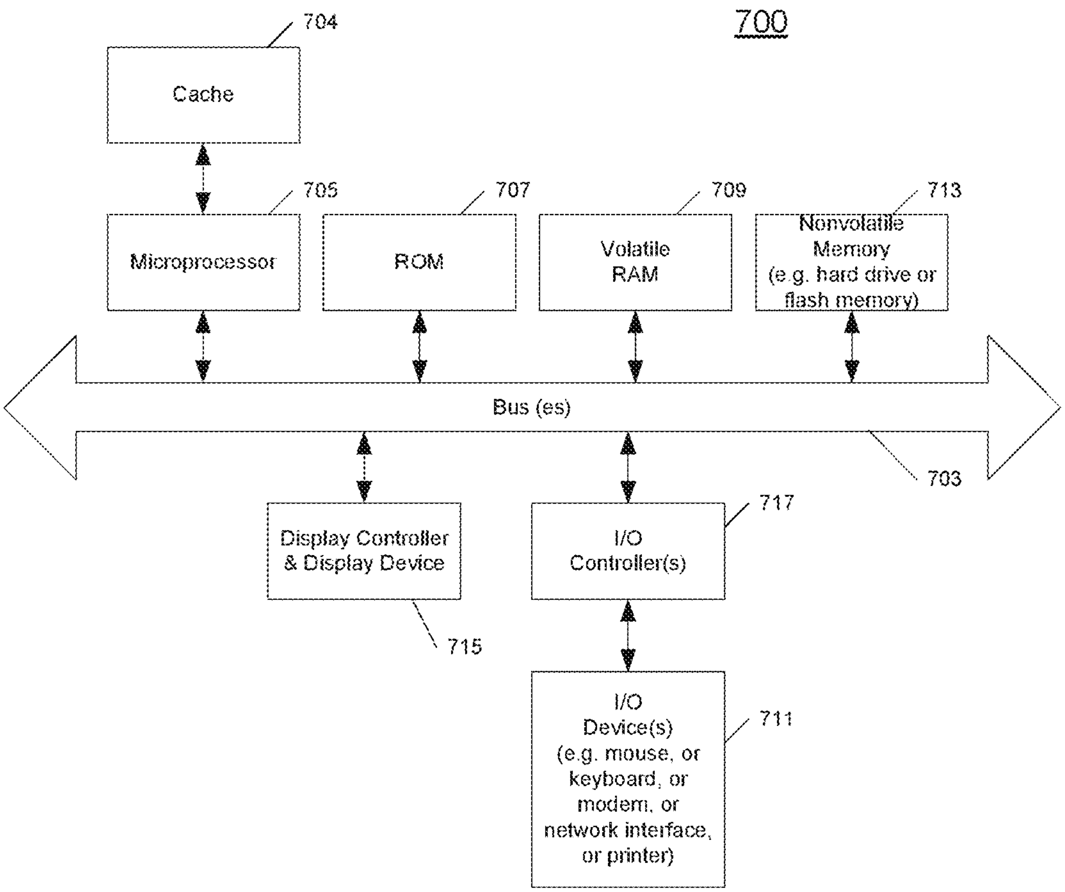
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented as a system that includes device 102 as illustrated in FIG. 1 above. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may include one or more CPU(s), GPU(s), a specialized processor, and/or a combination thereof. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 719 and to peripheral devices such as input/output (I/O) devices which may be mice, keyboards, modems, network interfaces, printers and other devices which are well known in the art. Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
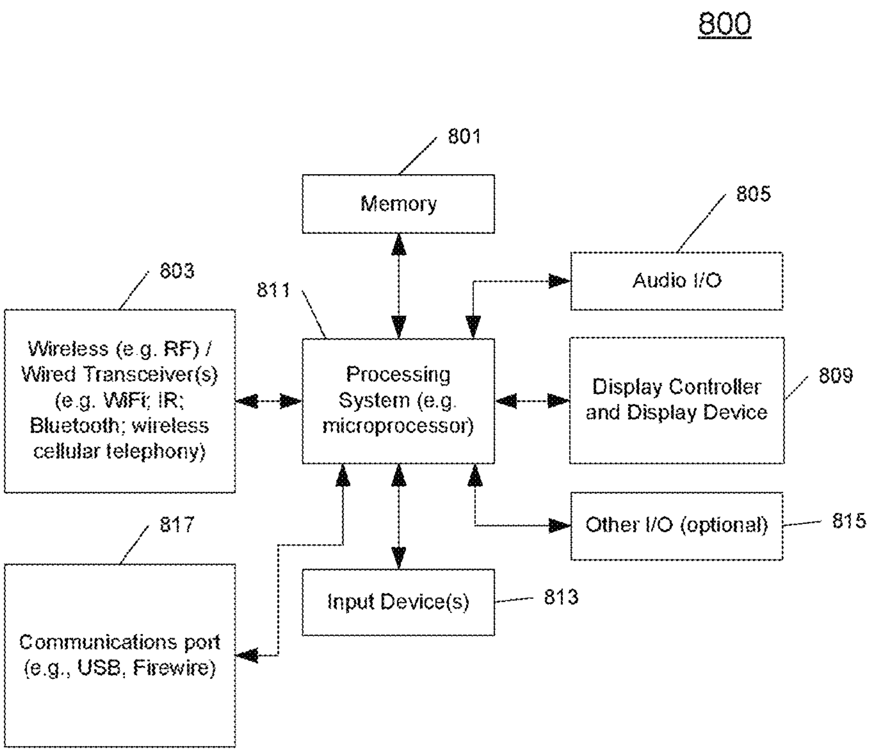
FIG. 8 shows an example of a data processing system, which may be used with one embodiment of the present invention.

FIG. 8 shows an example of another data processing system 800 which may be used with one embodiment of the present invention. For example, system 800 may be implemented as device 102 as shown in FIG. 1 above. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805, which may include a microphone and a speaker for, for example, playing back music or providing telephone functionality through the speaker and microphone.

A display controller and display device 809 provide a visual user interface for the user; this digital interface may include a graphical user interface which is similar to that shown on a Macintosh computer when running OS X operating system software, or Apple iPhone when running the iOS operating system, etc. The system 800 also includes one or more wireless transceivers 803 to communicate with another data processing system, such as the system 800 of FIG. 13. A wireless transceiver may be a WLAN transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 10 may also be used in a data processing system. The system 800 further includes one or more communications ports 817 to communicate with another data processing system, such as the system 1500 of FIG. 15. The communications port may be a USB port, Firewire port, Bluetooth interface, etc.

The data processing system 800 also includes one or more input devices 813, which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 13 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 800 may be a network computer or an embedded processing device within another device, or other types of data processing systems, which have fewer components or perhaps more components than that shown in FIG. 13.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, CA, a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMS, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as “detecting,” “determining,” “presenting,” “redirecting,” “communicating,” “requesting,” “sending,” “receiving,” “loading,” “negotiating,” “returning,” “selecting,” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to convert an account associated with an application to use a single sign-on service, the method comprising:

receiving, on a device, an indication of a weak password associated with the account; and in response to receiving the indication of the weak password, converting the authorization process for the account to the single sign-on service by, negotiating an authorization token with an identification server using a single sign-on credential for the account, and sending a message to a server associated with a service for the application that the application is registered for a single sign-on service, wherein the sending of the message includes forwarding the authorization token to the server associated with the service.

2. The non-transitory machine-readable medium of claim 1, wherein a single sign-on service is a service that allows a user to use a single set of credentials to sign-on to multiple services across one or more authorization domains.

3. The non-transitory machine-readable medium of claim 1, wherein the converting of the authorization process further comprises:

requesting the single sign-on credential for the account.

4. The non-transitory machine-readable medium of claim 1, wherein the converting of the authorization process further comprises:

receiving the single sign-on credential.

5. The non-transitory machine-readable medium of claim 1, further comprising:

performing a local authorization on the device using a set of user credentials.

6. The non-transitory machine-readable medium of claim 5, wherein the set of user credentials are selected from the group consisting of biometric user credentials or a username and password.

7. The non-transitory machine-readable medium of claim 1, further comprising:

converting the account to use the single sign-on service.

8. The non-transitory machine-readable medium of claim 1, further comprising:

sending a request to verify the single sign-on credential for the account that comprises;

presenting a third-party authorization user interface; and receiving third-party credentials from the user.

9. The non-transitory machine-readable medium of claim 8, further comprising:

sending the third-party credential, wherein the third-party credential is verified.

10. The non-transitory machine-readable medium of claim 1, wherein the weak password includes at least of one of a full word, a password common to another account, a password with easily detectable patterns, a password with a known name associated with the user, a password derived from characteristics of a user, or a password taken associated with a compromised service.

11. The non-transitory machine-readable medium of claim 10, wherein an easily detectable pattern is at least one of a sequence of increasing numbers, a sequence of increasing letters, a sequence of letters that follow a keyboard pattern, or a sequence of numbers that follow keyboards patterns.

12. A method to convert an account associated with an application to use a single sign-on service, the method comprising:

receiving, on a device, an indication of a weak password associated with the account; and in response to receiving the indication of the weak password, converting the authorization process for the account to the single sign-on service by, negotiating an authorization token with an identification server using a single sign-on credential for the account, and sending a message to a server associated with a service for the application that the application is registered for a single sign-on service, wherein the sending of the message includes forwarding the authorization token to the server associated with the service.

13. The method of claim 12, wherein a single sign-on service is a service that allows a user to use a single set of credentials to sign-on to multiple services across one or more authorization domains.

14. The method of claim 12, wherein the converting of the authorization process further comprises:

requesting the single sign-on credential for the account.

15. The method of claim 12, wherein the converting of the authorization process further comprises:

receiving the single sign-on credential.

16. The method of claim 12, further comprising:

performing a local authorization on the device using a set of user credentials.

17. The method of claim 16, wherein the set of user credentials are selected from the group consisting of biometric user credentials or a username and password.

18. The method of claim 12, further comprising:

converting the account to use the single sign-on service.

19. The method of claim 12, further comprising:

sending a request to verify the single sign-on credential for the account that comprises:

presenting a third-party authorization user interface; and receiving third-party credentials from the user.

20. A device to convert an account associated with an application to use a single sign-on service, the device comprising:

at least one processor;

a memory coupled to the processor through a bus; and a process executed from the memory by the processor that causes the processor to receive, on a device, an indication of a weak password associated with the account, and in response to receiving the indication of the weak password, convert the authorization process for the account to the single sign-on service by, negotiating an authorization token with an identification server using a single sign-on credential for the account, and sending a message to a server associated with a service for the application that the application is registered for a single sign-on service, wherein the sending of the message includes forwarding the authorization token to the server associated with the service.

* * * * *